INVENTOR.
JOHN R. JOHNSON

April 11, 1967
J. R. JOHNSON
3,313,409
APPARATUS FOR INSPECTING GLASSWARE
Filed Feb. 7, 1964
10 Sheets-Sheet 4
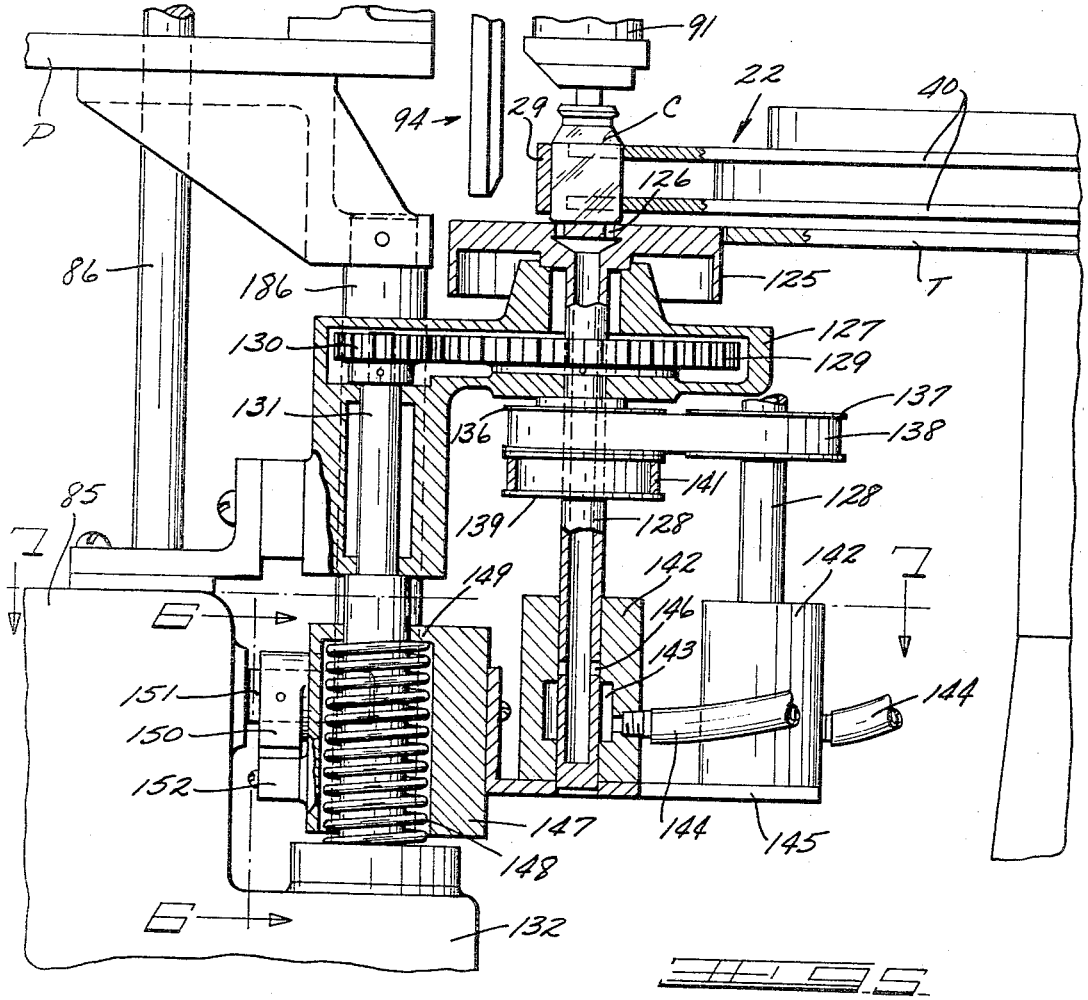
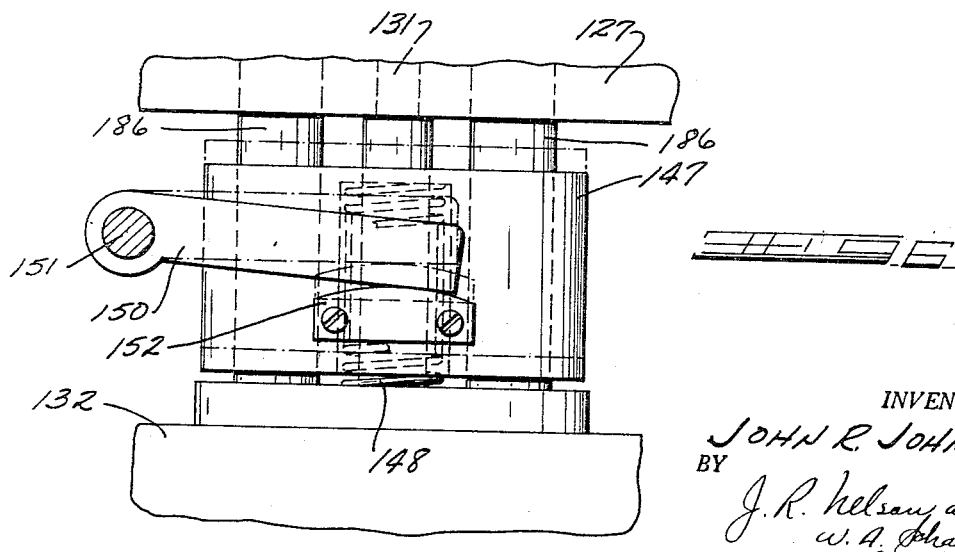
INVENTOR.
JOHN R. JOHNSON
BY
J. R. Nelson and
W. A. Phaich
ATTORNEYS

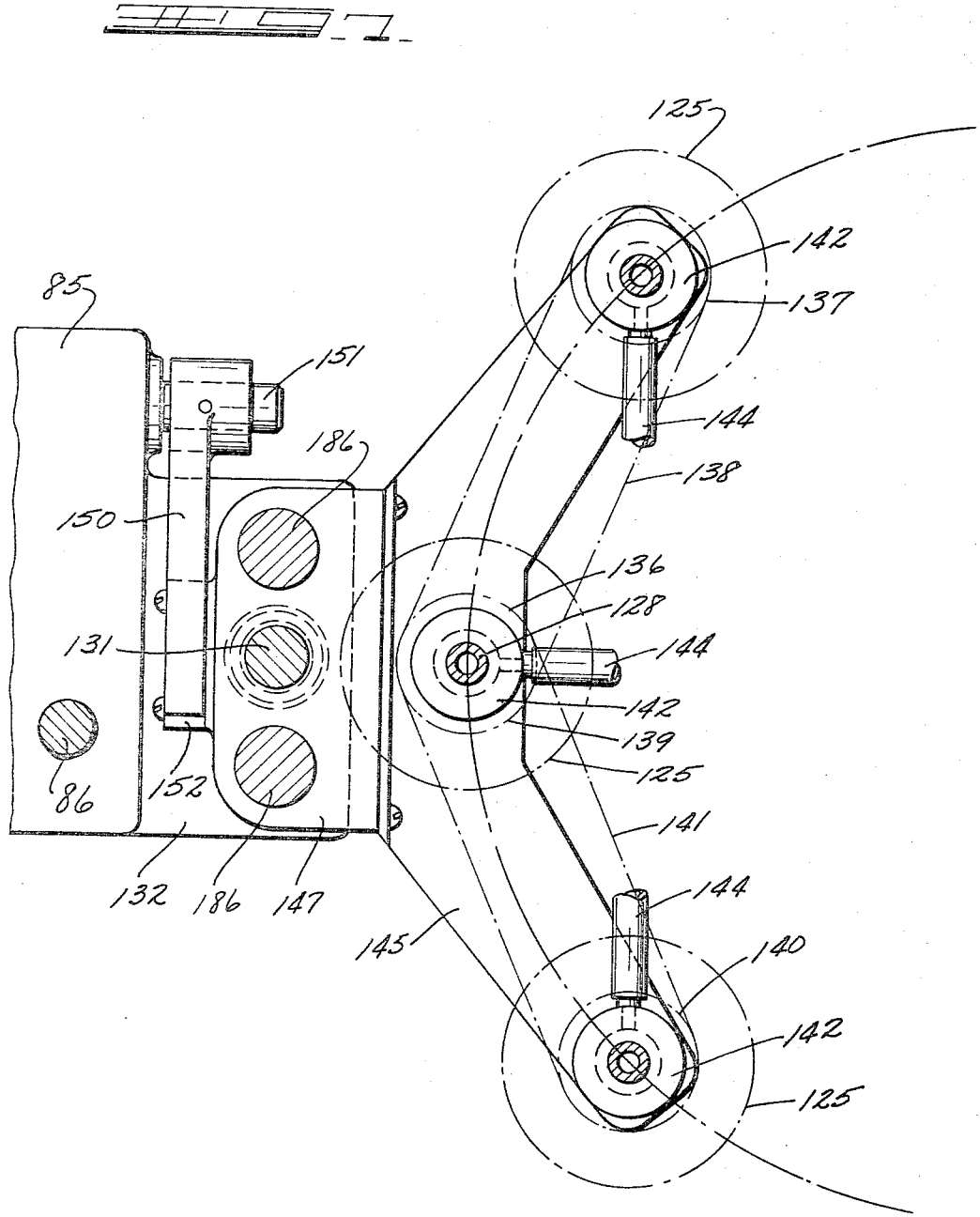

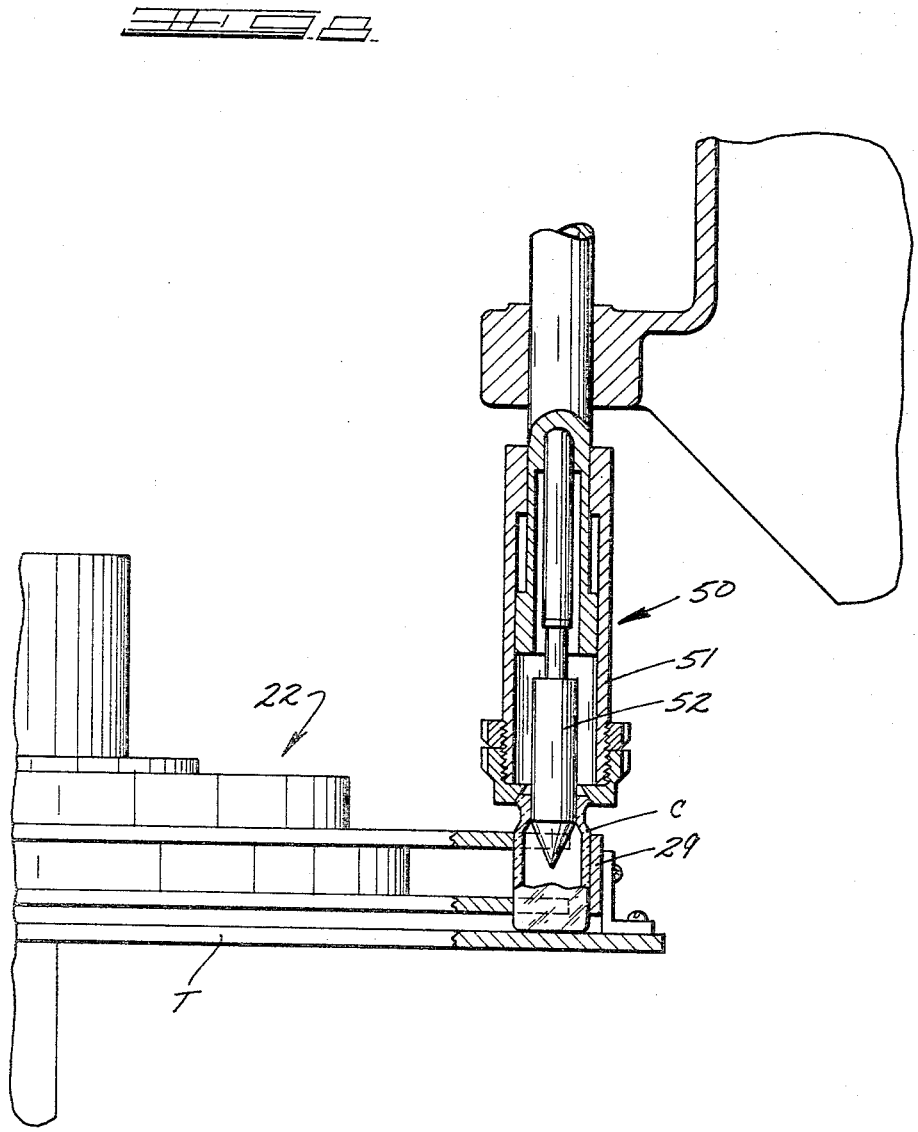

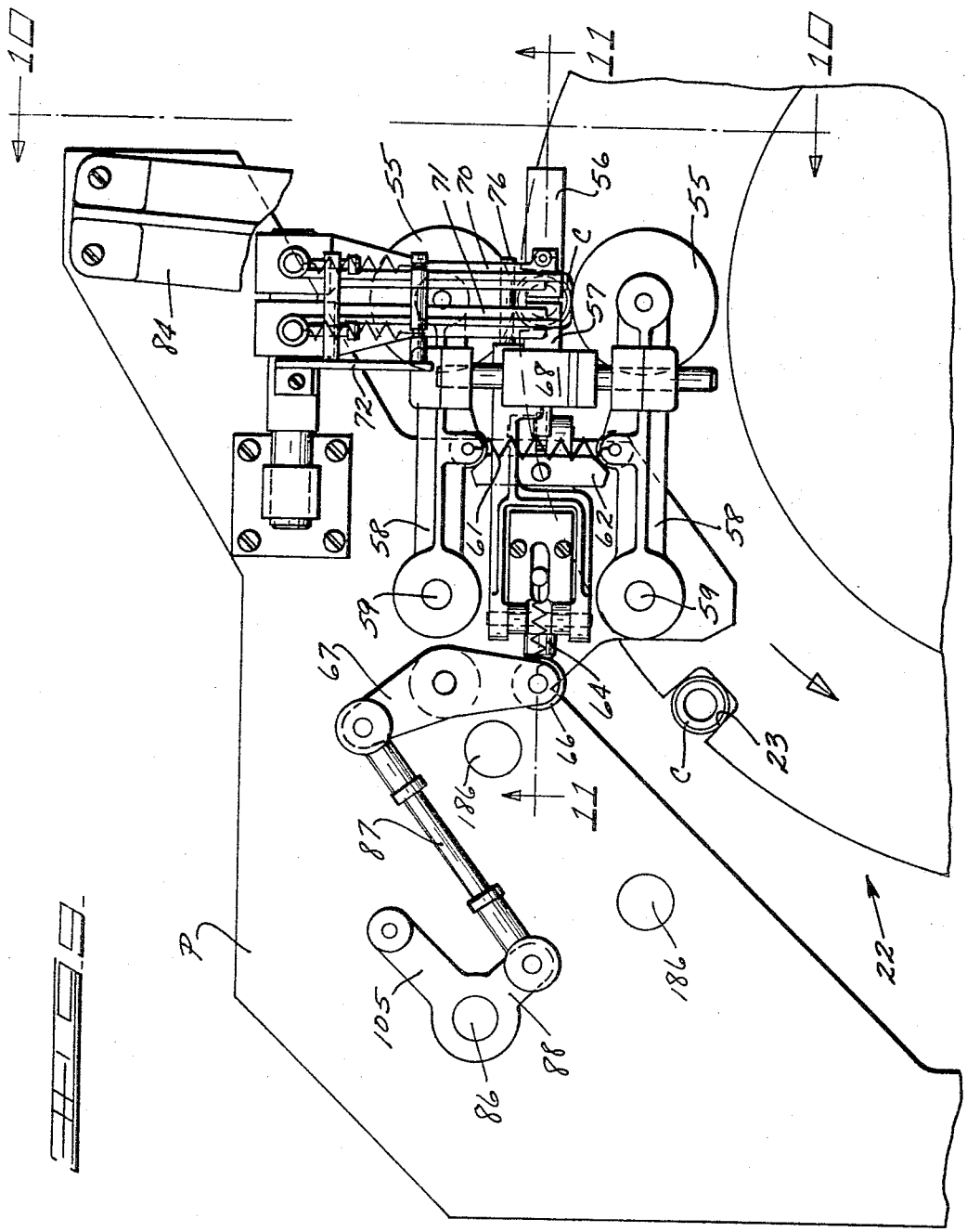

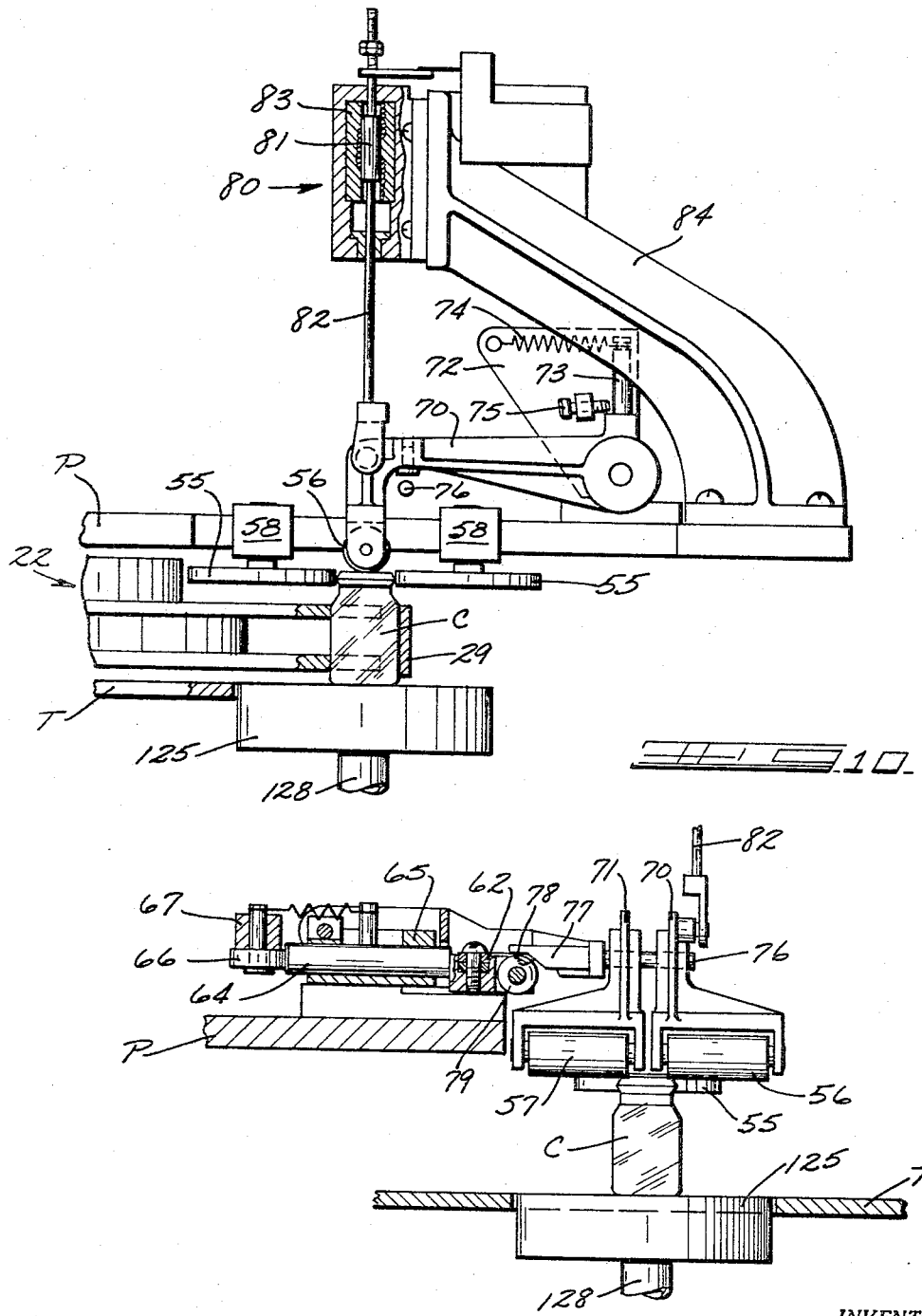

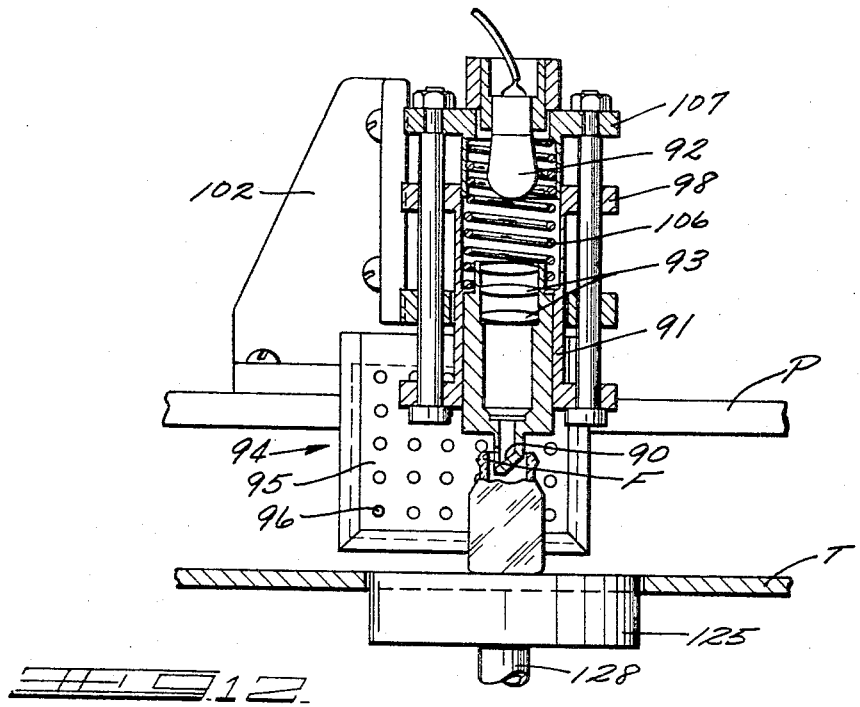
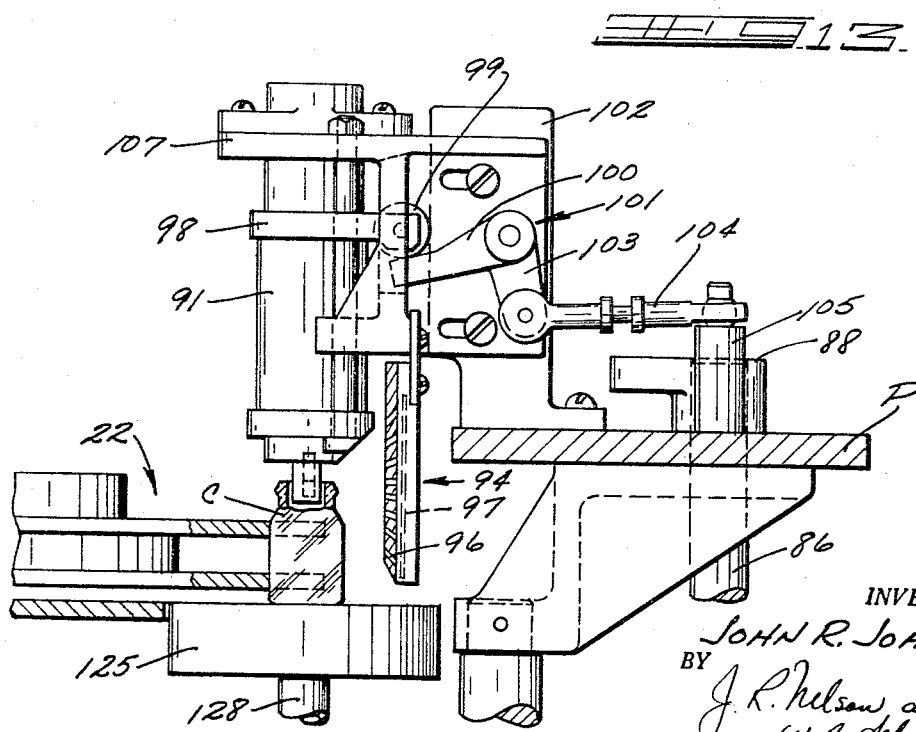

April 11, 1967 J. R. JOHNSON 3,313,409
APPARATUS FOR INSPECTING GLASSWARE
Filed Feb. 7, 1964 10 Sheets-Sheet 10
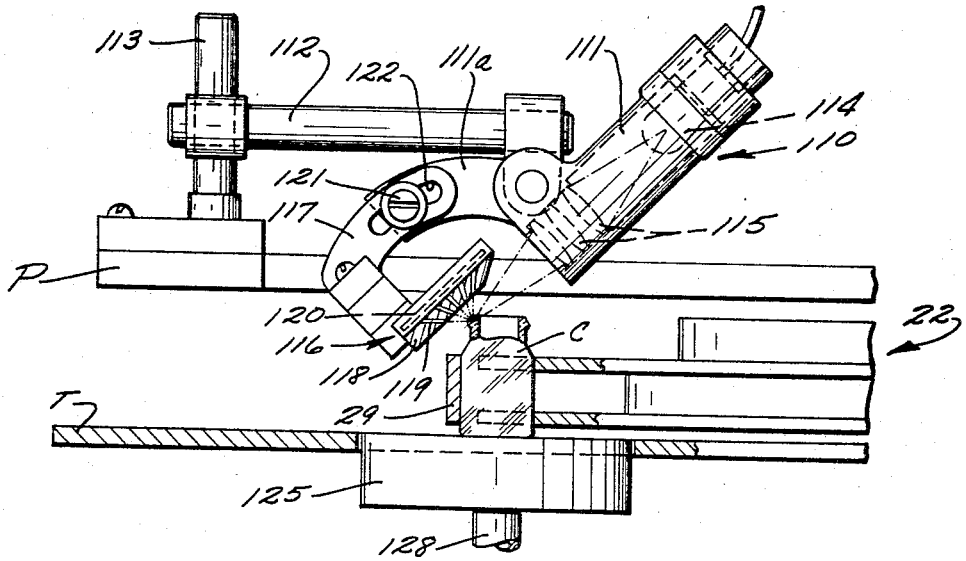
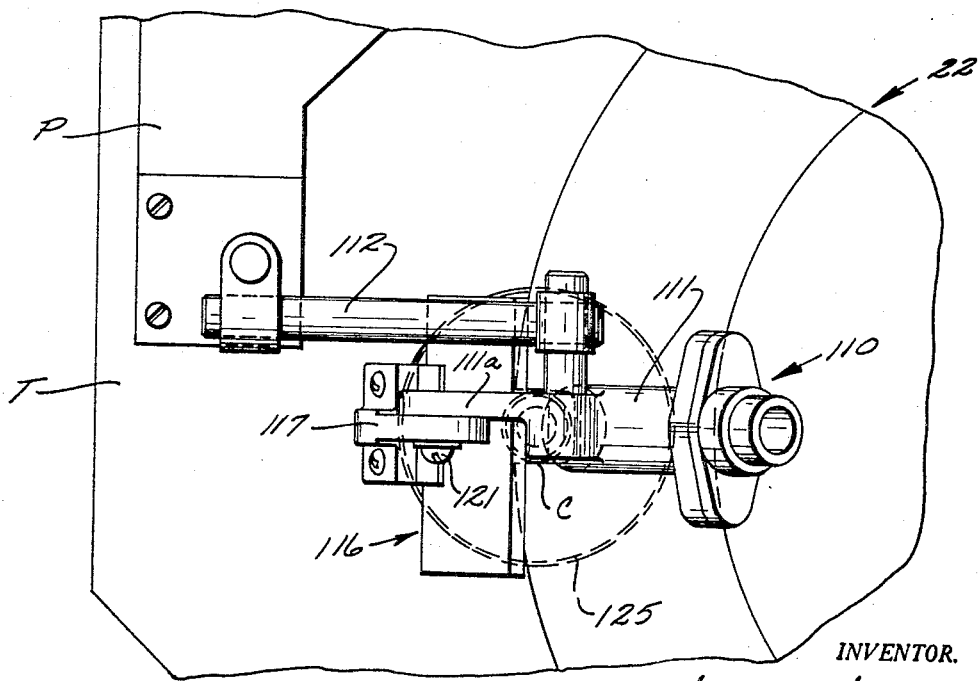
INVENTOR.
JOHN R. JOHNSON
BY
ATTORNEYS United States Patent Office 3,313,409
Patented Apr. 11, 1967

3,313,409
APPARATUS FOR INSPECTING GLASSWARE
John R. Johnson, Toledo, Ohio, assignor to Owens-Illinois, Inc., a corporation of Ohio
Filed Feb. 7, 1964, Ser. No. 343,404
12 Claims. (Cl. 209—73)

This invention relates to apparatus for inspecting glassware and particularly to apparatus for inspecting the finish of hollow glass containers for defects.

In the manufacture of open mouth hollow glass containers having a finish, it is important to inspect the containers for internal and external diameter, variations in height, variations in the level of the finish around the periphery thereof, commonly known as warp and dip and cocked finish, vertical checks and horizontal checks in the finish.

The problem of making such inspections at high speeds is particularly difficult in containers which are of small vertical height and have a neck of relatively small diameter, commonly known as narrow neck finishes.

It is an object of this invention to provide an apparatus for quickly and efficiently inspecting glass containers and particularly glass containers having narrow neck finishes.

It is a further object of the invention to provide such an apparatus wherein a glass container does not have to be raised and lowered to bring it into inspecting position.

It is a further object of the invention to provide such an apparatus which can be readily adjusted for inspecting containers of different sizes.

It is a further object of the invention to provide such an apparatus including novel means for feeding the glass containers to the inspecting device.

It is a further object of the invention to provide such an apparatus including novel means for rejecting the containers.

It is a further object of the invention to provide such an apparatus including novel means for inspecting for outer diameter, warp and dip, cocked finish, vertical checks and horizontal checks.

In the drawings:

FIG. 5 is a fragmentary sectional view on an enlarged scale taken along the line 5—5 in FIG. 1.

FIG. 6 is a fragmentary sectional view on an enlarged scale taken along the line 6—6 in FIG. 5.

FIG. 7 is a fragmentary sectional view taken along the line 7—7 in FIG. 5.

FIG. 8 is a fragmentary sectional view taken along the line 8—8 in FIG. 1.

FIG. 9 is a fragmentary plan view on an enlarged scale of a portion of the apparatus shown in FIG. 1.

FIG. 10 is a fragmentary sectional view taken along the line of 10—10 in FIG. 9.

FIG. 11 is a fragmentary sectional view taken along the line 11—11 in FIG. 9.

FIG. 12 is a fragmentary sectional view taken along the line 12—12 in FIG. 1.

FIG. 13 is a fragmentary sectional view taken along the right side of the apparatus shown in FIG. 12.

FIG. 14 is a fragmentary view taken along the line 14—14 in FIG. 1.

FIG. 15 is a plan view of the apparatus shown in FIG. 14.

*General description*

Figure 1:
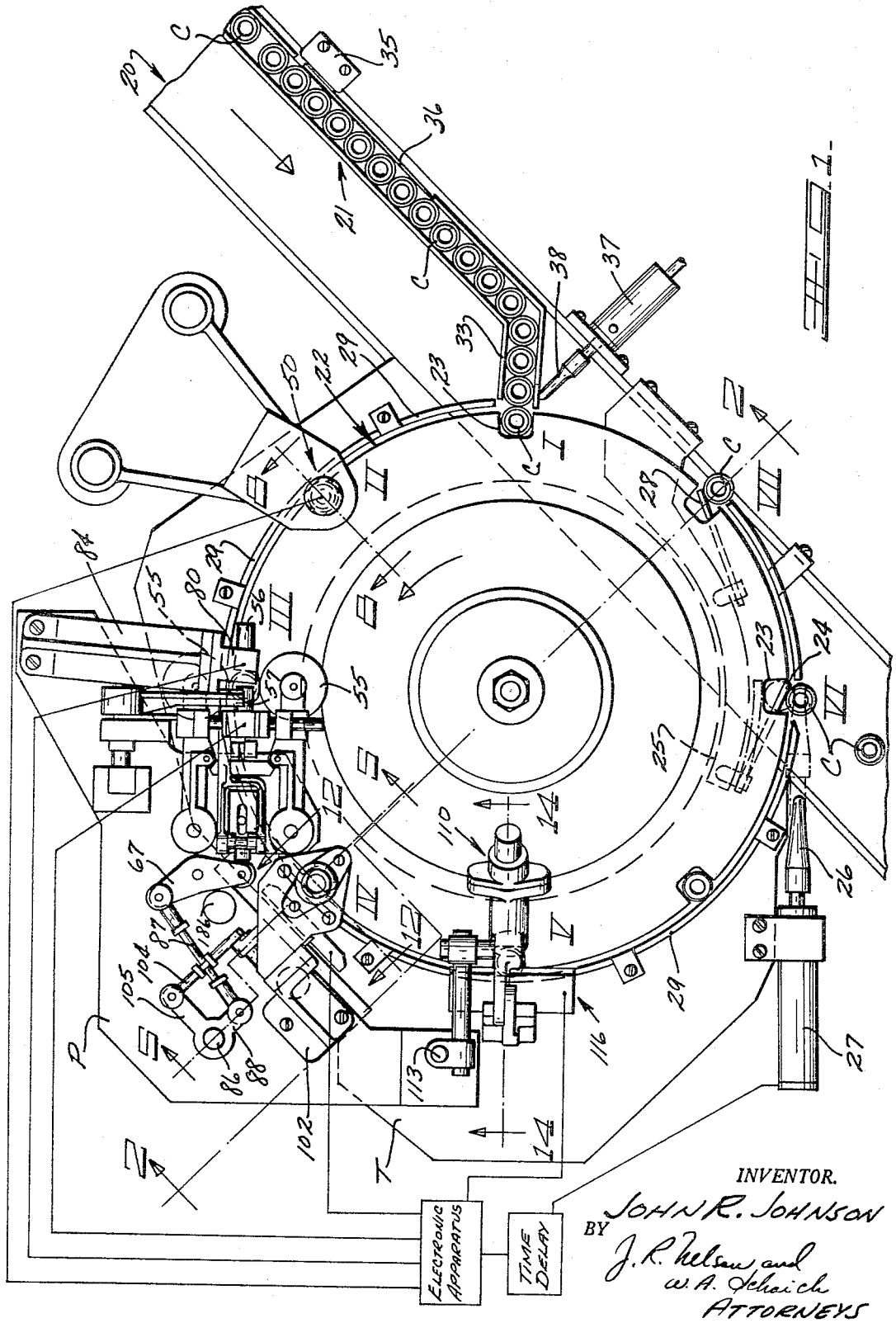
FIG. 1 is a fragmentary plan view of an apparatus embodying the invention.

Referring to FIG. 1, the apparatus is shown for inspecting the finish of small narrow neck glass containers C. The containers C are moved by a belt conveyor 20 successively and are guided by a guideway 21 to an indexing head 22 at a feeding or charging station I. Indexing head is circular and has a plurality of circumferentially spaced pockets 23 along the periphery thereof into which the containers C are fed by the movement of the conveyor 20. As shown in FIG. 1, a portion of the indexing head overlies the conveyor 20 and is substantially tangent to one edge thereof.

Indexing head 22 is successively indexed to bring each container into position adjacent stations II, III, IV, V where the containers are inspected for various defects, as presently described.

At station II, the container is inspected for internal diameter of the finish.

At station III, the container is inspected for outer diameter of the finish and for height, warp and dip condition and cocked finish condition.

At station IV, the container is inspected for vertical checks in the finish.

At station V, the container is inspected for horizontal checks in the finish.

The inspecting apparatus at stations III, IV and V are mounted on a single support plate P which is adjustably supported on a shaft 186 (FIG. 2), so that the inspecting apparatus at these stations can be vertically adjusted simultaneously relative to the table T along which the indexing head (22) moves the containers. By this arrangement, the three inspecting apparatus are simultaneously adjusted to accommodate containers of differing heights.

After each container has been inspected, successive indexing of the indexing head 22 brings each pocket 23 to a discharge station VI over the conveyor 20 where the action of a discharge spring 24 operates to eject the container from the pocket 23 onto the conveyor 20 which thereafter carries the container away from the inspecting apparatus. Discharge spring 24 comprises a plastic rod such as nylon which is fastened at one end to a fixed support 25 and normally projects into the path of a container C as it is positioned in the pocket.

In the event that there has been a reject signal from one of the inspecting stations II, III, IV or V, after an appropriate time delay by electronic apparatus (not shown), a plunger 26 actuated by a solenoid 27 is projected at the proper time adjacent the periphery of the indexing head 22 at the discharge station to prevent the spring 24 from discharging the container C from the pocket 23. Further indexing of the indexing head 22 causes a container C which is to be rejected and which is being retained in the pocket 23, to flex the spring 24 to the dotted line position shown in FIG. 1 and move past the spring to a reject position station VII where another spring 28 fastened to the bracket 25 operates to reject the container C from the pocket and off the conveyor 20. Spring 28 is a substantially identical construction as spring 24. In the area between the entry position I and the discharge position VI a guide rail maintains the container C in the pocket 23.

*Feeding apparatus*

Figure 3:
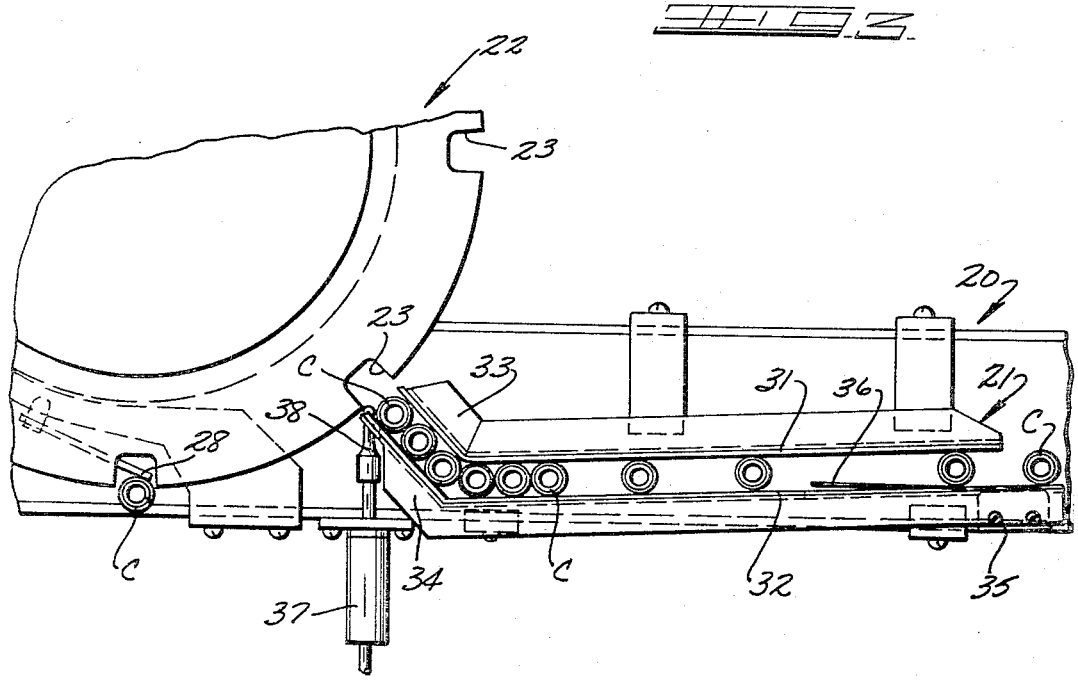
FIG. 3 is a fragmentary plan view of a portion of the apparatus shown in FIG. 1.
Figure 4:
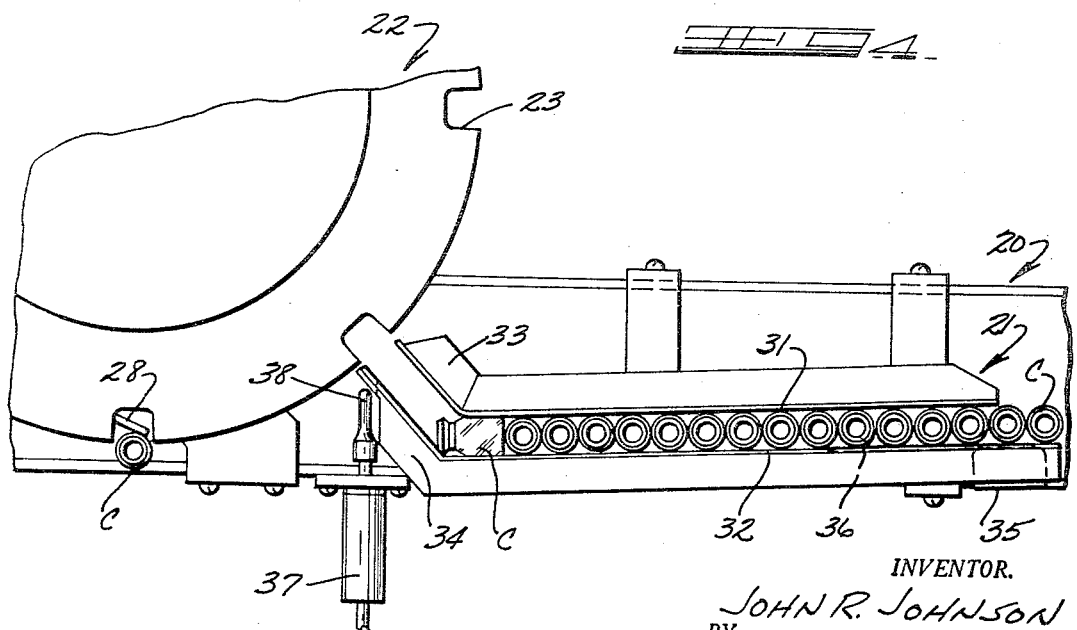
FIG. 4 is a view similar to FIG. 3 showing the apparatus in a different operative position.

Referring to FIGS. 3 and 4, which are enlarged plan views of the charging or feed station I, guide way 21 comprises main spaced straight guide rail sections 31, 32 between which the containers C are successively moved by conveyor 20. The discharge end of guideway rail 21 comprises second guide rail sections 33, 34 at an angle to the first sections 31, 32 so that the containers C are moved laterally of the conveyor 20 and thereby tend to accumulate in the guideway 21. The axis of the sections 33, 34 is aligned so that the containers C are fed substantially radially inwardly to the pockets 23.

A plunger 38 normally projects into the path of the containers C at the end of the sections 33, 34 to prevent the containers from being fed inwardly to the pocket 23. As the indexing head 22 is moved to bring an empty pocket 23 into position, a solenoid 37 is energized to retract plunger 38 permitting the conveyor 20 by its movement to feed a container C into the pocket. A switch 35 is provided adjacent rail 32 and has an actuating arm 36 extending along the wall of the rail 32. If containers C are not accumulated sufficiently in the guideway 21 to depress the actuating arm 36, solenoid 37 will not be energized even though an empty pocket 23 is in position for receiving a container C.

Referring to FIG. 4, the angularity of the sections 33, 34 relative to the main sections 31, 32 of the guideway 21 is such as to prevent feeding of the containers in the event that a container has fallen on its side. Thus, in the case of a short container, as shown in FIG. 4, if the container C has fallen on its side, it becomes wedged in the area of juncture between the main sections 31, 32 and the second sections 33, 34, of guideway 21 and thereby is not fed to the indexing apparatus. In the case of short containers, this is an important feature to prevent damage to the apparatus.

*Indexing apparatus*

Figure 2:
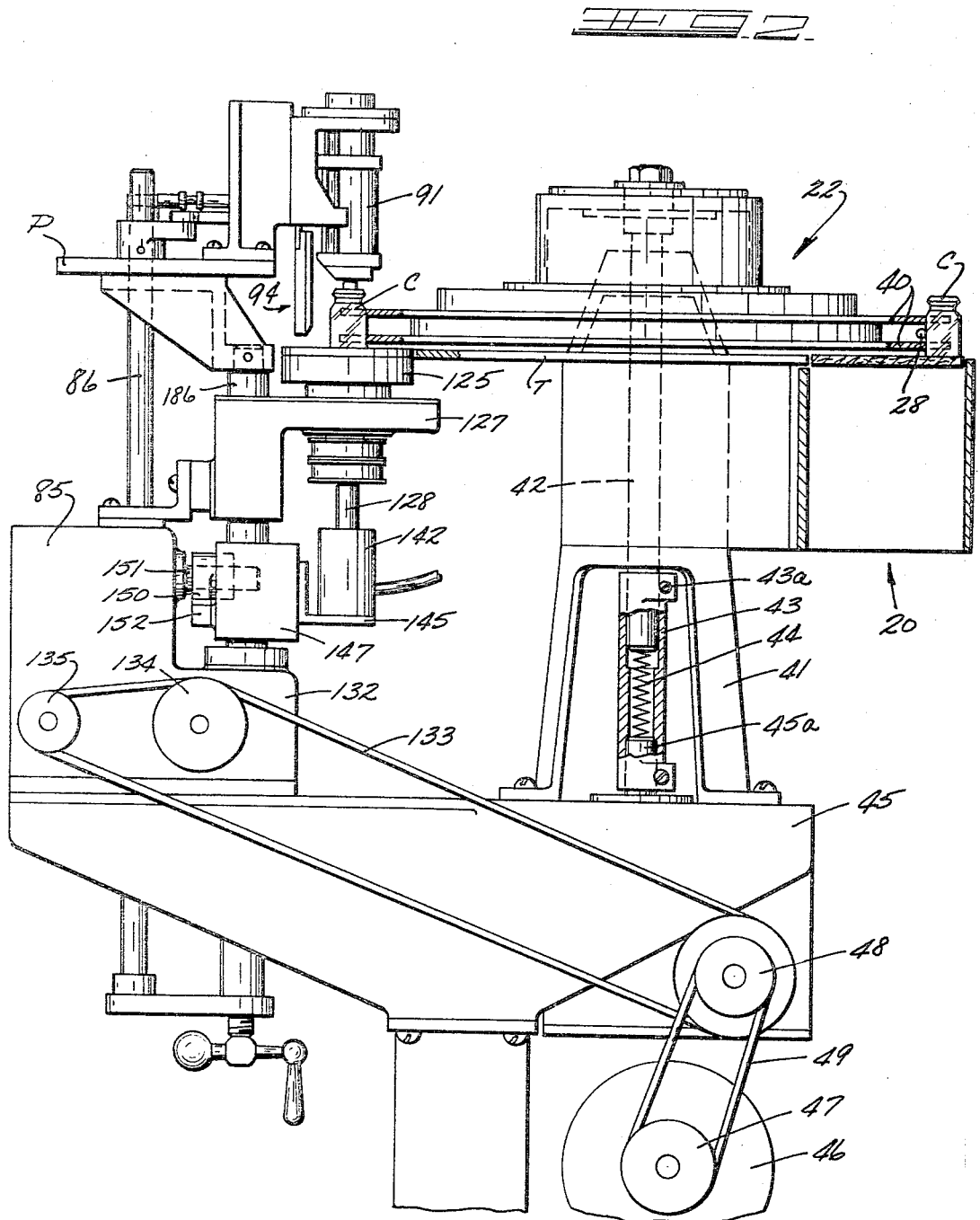
FIG. 2 is a sectional view on an enlarged scale taken along the line 2—2 in FIG. 1.

Referring to FIG. 2, the indexing head 22 comprises a plurality of spaced discs 40 in the periphery of which the pockets 23 are located. The head 22 is rotatably supported on a base 41 and is vertically adjustable thereon by arrangement which includes a central shaft 42 on which the head is supported and a collar 43 in which the shaft 42 is adjustably fixed. A spring 44 yieldingly supports the indexing head 22 when the screws 43a are loosened to permit the indexing head to be readily moved by depressing the spring to the desired elevation. Collar 43 is in turn fixed on a shaft 45a of an indexing mechanism 45. This indexing mechanism can be of any well known construction which will produce a periodic movement of the shaft 45a and, in turn, of the indexing head 22. The drive for the indexing mechanism 45 is received from a motor 46 which drives the indexing mechanism 45 through pulleys 47, 48, and belt 49.

*Inspecting internal diameter*

At station II, the containers C are inspected for proper internal diameter of the open mouth or neck of the container C. A shown in FIG. 8, as the container C is brought into position by the indexing head 22, a plug gauge 50 is moved downwardly, bringing a collar 51 into engagement with the top of the container and a plunger 52 downwardly within the neck of the container. If the movement of the plunger 52 is interrupted, an electrical signal is produced which causes an electrical reject signal. Such apparatus is well known, for example, in the patent to McNutt et al., 2,596,342.

*Inspecting outer diameter, height, warp and dip, and cocked finish*

At station III, the containers C are inspected for proper external diameter of the finish and for height, warp and dip, and cocked finish. Warp and dip and cocked finish are variations in height along the periphery of the container as presently described.

Referring to FIG. 9, as a container C is brought into position adjacent the inspecting station, it moves between a pair of rollers 55 which are brought into contact with the side of the finish of the container. The container is then rotated about its axis, as presently described, and if the diameter at any point exceeds or is below predetermined limits, the movement of the rollers 55 will produce a reject signal.

At the same time, at station III, rollers 56, 57 are brought into engagement with the top surface of the container C (FIG. 10). As the container is rotated, variations in level of the top finish of the container will cause up and down movement of the rollers 56, 57 which are indicative of height and warp and dip, and cocked finish conditions. This, in turn, is transmitted to electrical sensing apparatus and if the movement exceeds predetermined amounts, an electrical reject signal is produced, as presently described, to energize reject plungers 26 at the proper time.

Referring to FIG. 9, the rollers 55 are mounted on the ends of levers 58 that are pivoted to plate P by short vertical shafts 59. A spring 61 extends between levers 58 and yieldingly urges the levers toward one another. A cam plate 62 is slidably mounted for horizontal movement on plate P and engages on levers 58 to spread the levers 58 apart against the action of spring 61 and thereby permit entry of the container C into position between the rollers 55 for checking of the outer diameter. The cam plate 62 is moved by a pin 64 that is slidably mounted in a bracket 65 on plate P. A roller 66 mounted on the end of a lever 67 moves the pin 64 to the right, as shown in FIGS. 9 and 11, to in turn move the plate 62 and spread the arms 58 apart.

At an appropriate time after the indexing head 22 has been moved into position to bring the container C into position at the inspecting station III, lever 67 swings in a clockwise manner, as shown in FIG. 9, permitting the cam plate 62 to move to the left so that the spring 61 swings the levers 58 and in turn the rollers 55 inwardly to bring the rollers 55 into engagement with the periphery of the container C (FIG. 10). The apparatus for producing electrical signals in case the diameter varies beyond predetermined limits comprises a differential transformer 68 which has parts thereof controlled by the levers 58. Such an apparatus is shown in the patent to Fedorchak et al. 2,988,218, issued June 13, 1961, and titled Apparatus for Gauging and Inspecting Glassware.

Referring to FIGS. 9, 10 and 11, the rollers 56, 57 which are used for inspecting for warp and dip, level or tilt of the finish commonly known as a cock finish and height, are supported for rotation about a horizontal axis on parallel arms 70, 71 that are pivoted about a horizontal axis on a bracket 72. Pins 73 extend upwardly from the ends of the arms and a spring 74 extending between the upper ends of the pins 73 and the bracket 72 yieldingly urges the arms and in turn the rollers 56, 57 downwardly. An adjustable stop 75 limits the downward movement of the arms. When a container C is in inspecting position, rollers 56, 57 engage the top surface of the finish and extend diametrically of the container with their axes substantially at a right angle to a radius of the indexing head 22.

In order to swing the arms upwardly and permit the entry of the container C to the inspecting station, a transverse pin 76 mounted on a slide on plate P is positioned below the arms 70, 71 and is adapted to be moved upwardly to lift the arms 70, 71. As shown in FIG. 11, the end of the slide 77 is formed with an inclined surface 78 that is adapted to be engaged by a roller 79 on the cam plate 62. When the cam plate 62 is moved to the right to spread the arms 58 and move the rollers 55 apart, the roller 79 thereon contacts the inclined surface 78 and causes the slide 77 to move upwardly and lift the arms 70, 71 to elevate the rollers 56, 57 and permit the container C to enter the inspection station. Upon retraction of the slide 62, the roller 79 moves to the left, permitting the slide 77 to move downwardly and causing the rollers 56, 57 to engage the upper surface of the container C.

As the container C is rotated about its axis, the rollers 56, 57 move upwardly and downwardly with variations in the surface of the container C. Roller 57 serves to stabilize the apparatus while roller 56 serves to sense the variations in the level. If the variations in the height of the surface of the finish around the periphery exceeds predetermined tolerances in any unit distance around the periphery, commonly known as a warp and dip, the container should be rejected. Similarly, if the level or tilt of the finish varies, commonly known as a cock finish, the container should be rejected. Further, if the extreme limits of height of the finish vary, the container should be rejected.

The position of the roller 56 is sensed by a differential transformer 80 which has its core 81 connected to the arm 70 by a plastic link 82 and its windings 83 supported in a bracket 84. The differential transformer conventionally comprises a primary and a pair of secondary windings connected in series. There is a neutral position of the core so that when the core is moved up and down, a positive or negative signal is created with respect to the neutral position. In this arrangement, the position of the core corresponds to the height of the finish of the container C at any predetermined point, and therefore the height of the container at any predetermined point is indicated by the output of the transformer. If the container C has an excessive warp finish, then the core will move more than a predetermined amount. If the container C has an excessive dip in the finish, then the core will move more than a predetermined amount in a predetermined degree of periphery movement of the roller less than the peripheral distance in measuring for warp finish. If the container C has an excessive cock surface, then the core will have an excessive movement between the uppermost position and its lowermost position in a predetermined degree of peripheral movement of the roller. If the height of the container C is beyond predetermined limits, then the core will move upwardly or downwardly beyond a predetermined amount. These movements are converted into voltage signals by the differential transformer and transmitted to an appropriate electronic mechanism which compares the signals and produces a reject signal that energizes the reject plunger at the proper time in the event that the container is not within predetermined limits. Such an apparatus is shown in the copending application Ser. No. 176,997, filed Mar. 2, 1962, and titled, Gauging Apparatus, assigned to the assignee of the present application.

The oscillating movement of the lever 67 to move the rollers 55, 56 and 57 out of position and permit the container C to enter the inspecting station is achieved by an intermittently operating mechanism 85 which periodically oscillates a shaft 86 (FIG. 2, FIG. 9) to actuate a link 87 that is connected at one end to a crank 88 and at the other end to the lever 67. The oscillating movement of the shaft 86 is in timed relation to the indexing movement of the head 22.

*Inspecting for vertical checks*

At the station IV, the container is inspected for vertical checks in the finish which comprise mirrorlike defects that extend substantially vertically in the finish. As shown in FIG. 12, at the inspecting station IV, the container is brought into position and a mirror 90 mounted on the lower end of the housing 91 is moved downwardly within the open mouth of the container. Light from the filament of a bulb 92 is focused by lenses 93 and reflected from the mirror 90 into an image of the filament against the finish of the container at an acute angle to a vertical radial plane. The container C is rotated about its axis and if any defects, such as vertical checks, are present, a portion of the light is reflected by the defects to a solar cell assembly 94 mounted on bracket 102 alongside the path of the containers within its plane, preferably at a right angle to the path of the light to the finish. Solar cell assembly comprises a mask 95 with a plurality of openings 96 therein that are aligned with the focal point of the image of the light on the finish F of the container C.

A flat solar cell 97, comprising a plurality of flat silicon cells connected in series, is positioned behind the openings 96 and is adapted to be energized to produce a reject signal for actuating the reject plunger at the appropriate time.

In order to permit the entry of the container C at the inspection station, housing 91 is elevated to move the mirror 90 out of the open mouth of the container. As shown in FIG. 13, housing 91 includes an integral bracket 98 having a roller 99 mounted thereon which is adapted to be engaged by an arm 100 of lever 101 that is pivoted to a bracket 102 on a mounting plate P. Lever 100 includes an arm 103 that is connected by a link 104 to an arm 105 on bell crank 88 (FIG. 1). A spring 106 is interposed between a top bracket 107 that supports bulb 92 and the top of housing 91. Bracket 107 includes a tube 108 telescoped within housing 91. When the bell crank 88 is actuated periodically with the indexing movement of the head 22, the housing 91 is moved upwardly against the action of spring 106. This moves mirror 90 upwardly to permit a container C to enter the inspecting station IV. Movement of bell crank 88 in the opposite direction permits spring 106 to lower housing 91 and mirror within the open mouth of the container C to the proper level for inspection of the container for vertical checks.

*Inspection for horizontal checks*

At the station V, the containers C are inspected for mirrorlike defects which extend substantially horizontally and are commonly known as horizontal checks. As shown in FIGS. 14 and 15, the apparatus for inspecting for horizontal checks comprises a light source 110 which has a housing 111 mounted on a horizontal bar 112 which, in turn, is vertically adjustably mounted on a vertical post 113 fixed to the mounting plate P. Housing 111 encloses a light source 114 and lenses 115 that focus the filament of the light source 114 in a spot in the finish of the container C.

A solar cell assembly 116 is mounted on a bracket 117 which in turn is adjustably mounted on a projection 111a of the housing 111. Solar cell assembly 116 comprises a mask 118 having a plurality of openings 119 therein which have their lines of vision focused at the focal point of the spot of light on the finish of the container. A flat solar cell 120 is positioned behind the mask 118. When a container is in position and rotated about its axis and a horizontal check is present, the check reflects a portion of the light through the openings 119 in the mask 118 to a portion of the cell 120. This produces an electrical signal that is amplified and utilized to energize the reject plunger at the appropriate time for rejecting the container C.

The bracket 117 is adjustably mounted on the projection 111a by a screw 121 that extends through an elongated slot 122 in bracket 117 and is threaded in projection 111a. Thus the angular relationship between the focal point of the openings 119 and the direction of the beam from the source 114 can be adjusted to produce optimum results. Once the angular adjustment has been made, the housing 111 and in turn the cell assembly 116 can be pivoted on bar 112 without disturbing the angular relationship bewteen the light source and the cell. As shown in FIG. 15, the vertical plane containing the axis of the beam of light and the focal point of vision of solar cell assembly 116 lies along a radial plane of indexing head 22.

*Container rotating apparatus*

At each of the stations III, IV and V, the containers must be rotated about their axes in order to perform the inspection. The means for rotating the containers comprises a pad 125 at each station which is adapted to be rotated. Each pad 125 has openings 126 therein to which vacuum is connected for drawing and holding the container C against the pad during the rotation.

As shown in FIG. 5, the pad 125 at the station IV is rotatably mounted in a drive housing 127. A hollow shaft 128 extends downwardly from the underside of the path. A gear 129 is keyed to shaft 128 and is driven by a gear 130 meshed therewith fixed to a drive shaft 131 that in turn is continuously driven by a gear box 132 (FIG. 2). Gear box 132 is driven by an endless belt 133 trained over pulley 48, a pulley 134 of the gear box 132 and a pulley 135 of the intermittent drive mechanism 85.

The corresponding shafts 128 of the pads 125 at inspection stations III and V are rotatably mounted in housing and driven by interconnecting pulleys 136, 137 over which an endless belt 138 is trained and pulleys 139, 140 over which an endless belt 141 is trained (FIGS. 5 and 7).

In order to apply a vacuum at the appropriate time to the pads 125 when the containers C are at inspection stations III, IV and V, a distributor head 142 is associated with the lower end of each shaft 128 and comprises a chamber 143 to which a vacuum connection 144 is connected (FIG. 5). Distributor heads 142 are mounted on a plate 145 which is adapted to be raised and lowered. When the plate 145 is raised, each chamber 143 is brought into registry with openings 146 in the lower end of the shafts 128 permitting the vacuum to be connected and communicate with interior of the shaft 128 and the openings 126 in the pad 125.

Plate 145 is mounted on a block 147 that is normally yieldingly urged upwardly by a spring 148 interposed between the gear box 132 and a flange 149 on the block. An intermittent movement is provided to the block 147 to move it downwardly against the action of the spring 148 and move the distributors 142 out of registry during the movement of the head carrying the container C from one inspection station to the other. Specifically, an actuating lever 150 mounted on a shaft 151 is driven intermittently by the intermittent operating mechanism 85 (FIGS. 2 and 6). Actuating lever 150 operates on a cam block 152 fixed on the exterior of the block 147 to move the block downwardly against the action of the spring and thereby move distributors 142 and chambers 143 out of register with the openings 146.

Operation

In operation, the conveyor 20 successively feeds containers C into guideway 21 to fill the guideway. When the guideway is filled, switch arm 36 is depressed to energize solenoid 37 and retract plunger 38 permitting the conveyor to feed a container C in the guideway toward the periphery of the indexing head 22. As the indexing head is indexing automatically, a pocket 23 is brought into position adjacent to the end of the section 33 of guideway 21 so that the movement of the conveyor 20 feeds a container C into the pocket 23. Successive movement of the indexing head 22 moves the container to the stations II, III, IV and V where the article is inspected.

At station II, plug gauge 50 is moved downwardly within the finish of the container. If the movement of the plug 52 is interrupted, an electronic device is actuated which energizes the reject plunger 26 at the appropriate time.

As the container C is indexed from station II to station III, shaft 86 is oscillated to move link 87, lever 67 and plunger 64 (FIGS. 1, 11). This moves cam plate 62 to spread the diameter gauging rollers 55 apart and raise the rollers 56, 57 upwardly in order to permit the container C to be moved into inspection station III between the diameter measuring rollers 55 and beneath the rollers 56 and 57. At station III, pad 125 is rotated and simultaneously with the delivery of the container to the station, distributor 142 is raised, by the action of lever 150 and spring 148, to apply vacuum to the container.

If the diameter of a container exceeds predetermined limits, the electronic apparatus associated with the differential transformer 68 creates a reject signal which is utilized to project the container at the appropriate time. Simultaneously, if the top surface of the finish of the container exceeds prescribed standards for warp and dip, cocked finish and height, differential transformer 80 creates a reject signal through the electronic apparatus.

After the inspection at station III, shaft 86 is again oscillated to spread rollers 55 apart and raise rollers 56, 57 to permit a container C to be moved out of station III and permit a new container C to be moved into station III. This same movement is utilized through link 104 to raise the mirror housing 91 (FIGS. 12, 13). As the container C reaches the station IV, shaft 86 oscillates in the opposite direction permitting spring 106 to move the mirror housing 91 downward within the open mouth of the container, pad 125 is rotating and at the same time the distributor 142 is moved to apply vacuum to the base of the container.

If a vertical check is present in the finish of the container, a portion of the light beam from light source 92, which is focused in a spot on the finish of the container, is reflected by the mirror-like surface of the vertical check into one or more of the openings 96 in the solar cell assembly 94. This signal is amplified and utilized to energize the reject plunger at the appropriate time.

After the container C has been inspected at station IV, oscillation of the shaft 86 causes the mirror housing 91 to move upwardly permitting the container to be moved out of station IV to station V and permitting another container to be moved into station IV.

As the indexing movement of indexing head 22 brings the container to station V, the container is rotated by the pad and vacuum is applied to the base thereof by its associated vacuum distributor 142.

If a horizontal check is present in the finish of the container, the mirror-like surface of the horizontal check reflects the spot of light, which is focused in the finish of the container by the light source 110, into one or more of the openings 119 of solar cell assembly 116. This signal is amplified and utilized to reject the container at the appropriate time.

With respect to any particular container that has been moved by indexing head 22, through stations II, III, IV and V, if a reject signal is created at any of these stations, an appropriate time delay is energized which actuates the plunger 26 when that container reaches discharge station VI. This moves the plunger 26 adjacent the periphery of the indexing head 22 and prevents the container from being discharged by spring 24 onto the conveyor 20. Successive movement of the indexing head carries the container to the reject station VII where spring 28 pushes the container out of the pocket in the periphery of the indexing head 22 and off of the conveyor 20.

In practice, the apparatus is operated at high speeds to produce a quick and efficient inspection of the containers.

If it is desired to inspect containers having the same size neck but different heights, it is only necessary to change the vertical position of mounting plate P. This automatically moves the inspecting apparatus at stations III, IV, and V so that the apparatus is in position for inspecting the container of different height without any further adjustment. Since the plug gauge 50 operates by relative movement between collars 51 plate 52, as long as its reciprocating vertical stroke is sufficient, no adjustment need be made with respect to this apparatus.

I claim:
1. In an apparatus for inspecting glass containers, the combination comprising
   a conveyor,
   a table,
   an indexing head having a plurality of circumferentially spaced container receiving pockets mounted for rotation whereby said pockets are successively moved from the position overlying said conveyor to position along said table, a plurality of inspecting devices at circumferentially spaced points along the periphery of said indexing head and along said table for simultaneously inspecting a plurality of containers in said pockets, an entry station at the area of juncture of the periphery of said indexing head and said conveyor, means at said entry station defining a guideway for directing the containers in a row toward the periphery of the indexing head for feeding a glass container to the pockets of said indexing head, and means responsive to the movement of the indexing head and movable into the path of said glass containers toward the periphery of said indexing head to obstruct movement of a container toward the periphery except when an empty pocket is present in position adjacent said guideway.

2. In an apparatus for inspecting glass containers, the combination comprising a conveyor, a table, an indexing head having a plurality of circumferentially spaced pockets mounted for rotation whereby said pockets are successively moved from the position overlying said conveyor to a position along said table, said conveyor being aligned so that it moves said containers toward said table and into said pockets, a plurality of inspecting devices at circumferentially spaced points along the periphery of said indexing head and along said table, a mounting plate adjacent the periphery of said indexing head on which at least several of said inspecting devices are mounted, means for adjustably supporting said plate in vertical relation to said indexing head, an entry station at the area of juncture of the periphery of said indexing head and said conveyor, means at said entry station defining a guideway for directing the containers in a row toward the periphery of the indexing head for feeding glass containers to the pockets of said indexing head, sensing means in said guideway adapted to be energized by said glass containers, and means responsive to said sensing means and movable in the path of said glass containers toward the periphery of said indexing head to obstruct the movement of said containers toward the periphery, when said guideway is not substantially filled with glass containers, said guideway including a first section extending radially toward the periphery of said indexing head and a second section extending at an angle to said first section and substantially parallel to said conveyor whereby if a container is tipped over in its movement along said guideway, it is prevented from moving toward the periphery of the indexing head because of the change in direction caused by the angularity between the two sections of the guideway.

3. In an apparatus for inspecting glass containers, the combination comprising a conveyor, a table, an indexing head having a plurality of circumferentially spaced pockets mounted for rotation whereby said pockets are successively moved from the position overlying said conveyor to a position along said table, a plurality of inspecting devices at circumferentially spaced points along the periphery of said indexing head and along said table, an entry station adjacent the area of juncture of the conveyor and indexing head, means providing a guideway for guiding the containers in a row and directing them substantially radially toward said indexing head, a discharge station spaced from said entry station at the area of juncture of the periphery of said indexing head and said conveyor, means responsive to an electrical signal from one of said inspection stations for preventing the normal discharge of a glass container from a pocket of said indexing head to the conveyor and removal from said pocket by said conveyor, a reject station interposed between said entry station and said discharge station at the area where the periphery of said indexing head overlies said conveyor, and means normally urging a container out of a pocket at said reject station, whereby when said responsive means prevents the normal discharge of a glass container, subsequent movement of said pocket to the reject station brings the container into engagement with said reject means for discharge of said container from said pocket beyond the periphery of said conveyor, switch means in said guideway means adapted to be engaged by said glass containers, and means responsive to said switch means and movable in the path of said glass containers toward the periphery of said indexing head to obstruct the movement of said containers toward the periphery, when said guideway is not substantially filled with glass containers, said guideway means including a first section extending radially toward the periphery of said indexing head and a second section extending at an angle to said first section and substantially parallel to said conveyor whereby if a container is tipped over in its movement along said guideway, it is prevented from moving toward the periphery of the indexing head because of the change in direction caused by the angularity between the two sections of the guideway.

4. In an apparatus for inspecting glass containers, the combination comprising a conveyor, a table, an indexing head having a plurality of circumferentially spaced pockets mounted for rotation whereby said pockets are successively moved from the position overlying said conveyor to a position along said table, a plurality of inspecting devices at circumferentially spaced points along the periphery of said indexing head and along said table, an entry station at the area of juncture of the periphery of said indexing head and said conveyor, means at said entry station defining a guideway for directing the containers in a row toward the periphery of the indexing head for feeding a glass container to the pockets of said indexing head, switch means in said guideway adapted to be engaged by said glass containers, and means responsive to said switch means and movable in the path of said glass containers toward the periphery of said indexing head to obstruct the movement of said containers toward the periphery, when said guideway is not substantially filled with glass containers, said guideway including a first section extending radially toward the periphery of said indexing head and a second section extending at an angle to said first section and subsantially parallel to the conveyor whereby if a container is tipped over in its movement along said guideway, it is prevented from moving toward the periphery of the indexing head because of the change in direction caused by the angularity between the two sections of the guideway.

5. In an apparatus for inspecting glass containers, the combination comprising a conveyor, a table, an indexing head having a plurality of circumferentially spaced container receiving pockets mounted for rotation whereby said pockets are successively moved from the position overlying said conveyor for receiving containers to positions along said table, said conveyor being aligned so that it moves said containers toward said table and successively into said pockets, a plurality of inspecting devices at circumferentially spaced points along the periphery of said indexing head and along said table for simultaneously inspecting a plurality of containers in said pockets, an entry station at the area of juncture of the periphery of said indexing head and said conveyor, means at said entry station defining a guideway for directing the containers in a row toward the periphery of the indexing head for feeding glass containers to the pockets of said indexing head, said guideway including a first section extending radially toward the periphery of said indexing head and a second section extending at an angle to said first section and substantially parallel to said conveyor whereby if a container is tipped over in its movement along said guideway, it is prevented from moving toward the periphery of the indexing head because of the change in direction caused by the angularity between the two sections of the guideway.

6. In an apparatus for inspecting glass containers, the combination comprising a conveyor, a table, an indexing head having a plurality of circumferentially spaced container receiving pockets mounted for rotation whereby said pockets are successively moved from the position overlying said conveyor for receiving containers to positions along said table, said conveyor being aligned so that it moves said containers toward said table and successively into said pockets, and a height, warp and dip, and cocked finish inspecting apparatus comprising a pair of arms mounted for pivotal movement about horizontal axes substantially parallel to a tangent to the periphery of said indexing head, the ends of said arms adapted to engage the upper end of the finish of the container, one of said arms stabilizing said container, electronic means associated with the other of said arms for indicating changes in height of the finish of the container as the container is rotated by its respective pad, and means responsive to the movement of said indexing head in bringing a pocket into indexing position for raising said arms out of the path of said containers and thereafter lowering said arms onto the finish of the container.

7. In an apparatus for inspecting glass containers, the combination comprising a conveyor, a table, an indexing head having a plurality of circumferentially spaced container receiving pockets mounted for rotation whereby said pockets are successively moved from the position overlying said conveyor for receiving containers to positions along said table, said conveyor being aligned so that it moves said containers toward said table and successively into said pockets, and an outer diameter inspecting apparatus comprising a pair of arms mounted for swinging movement about vertical axes, one on each side of the path of movement of the container, the free ends of said arms extending toward and on each side of the path of the container into the inspecting station, means for yieldingly urging said arms toward one another, electronic means associated with said arms for indicating the diametral relation of said arms as the ends of said arms engage the finish of the container, and means responsive to the movement of the indexing head bringing a container into indexing position for moving said arms outwardly to permit a container to enter the inspecting station and thereafter permitting said arms to move inwardly to bring the ends of said arms into engagement with the finish of the container at the inspecting station.

8. In an apparatus for inspecting glass containers, the combination comprising a conveyor, a table, an indexing head having a plurality of circumferentially spaced container receiving pockets mounted for rotation whereby said pockets are successively moved from the position overlying said conveyor for receiving containers to positions along said table, said conveyor being aligned so that it moves said containers toward said table and successively into said pockets, a plurality of inspecting devices at circumferentially spaced points along the periphery of said indexing head and along said table for simultaneously inspecting a plurality of containers in said pockets, a mounting plate adjacent the periphery of said indexing head on which at least several of said inspecting devices are mounted, means for adjustably supporting said plate in vertical relation to said indexing head, and an entry station at the area of juncture of the periphery of said indexing head and said conveyor, means at said entry station defining a guideway for directing the containers in a row toward the periphery of the indexing head for feeding glass containers to the pockets of said indexing head, sensing means in said guideway adapted to be energized by said glass containers, and means responsive to said sensing means and movable in the path of said glass containers toward the periphery of said indexing head to obstruct the movement of said containers toward the periphery, when said guideway is not substantially filled with glass containers.

9. In an apparatus for inspecting glass containers, the combination comprising a conveyor for moving containers longitudinally toward an indexing head, an indexing head mounted for rotation with a portion of its periphery overlapping said conveyor, the periphery of said indexing head having circumferentially spaced container receiving pockets therein into which glass containers are separately fed by said conveyor, a table alongside said conveyor and underlying the periphery of said indexing head whereby said containers are moved in said pockets along said table, a mounting plate along the periphery of said indexing head and along said table, means for adjustably supporting said plate in vertical relation to said indexing head, a plurality of inspecting apparatus at circumferentially spaced points along the periphery of said indexing head and said table, one said inspecting apparatus comprising a plug gauge movable periodically downwardly into the upper end of a container at said inspection station for checking the internal diameter of the neck of the container, a successive inspecting apparatus comprising means mounted on said plate for checking the outer diameter of said container and checking height, warp and dip, and cocked finish condition of the finish of the container, another inspecting apparatus comprising means mounted on said plate for inspecting for vertical checks in the finish of the container, another inspecting apparatus comprising means mounted on said plate for inspecting for horizontal checks in the finish of the container, a pad at each of said three last-mentioned inspecting apparatus and means for rotating each said pad for rotating a container thereon, said apparatus for inspecting for vertical checks comprising a light source mounted on said plate, a mirror, a housing on said plate in which said mirror is mounted, means for directing a beam from said light source against said mirror and focusing it on a spot in the finish of the container, light sensitive means mounted on said plate externally of the container adjacent the path of the containers at the inspecting station adapted to be energized by reflection of light by a vertical check and means responsive to the movement of the indexing head in bringing a container to the inspection station for raising the mirror to permit a container to enter the inspection station and thereafter lower said mirror into the open mouth of the container, said means for raising and lowering said mirror comprising a spring yieldingly urging said mirror housing downwardly, said means responsive to the movement of the indexing head in bringing the container into inspecting position raising said housing against the action of said spring and thereafter permitting said housing to be lowered by the action of said spring.

10. In an apparatus for inspecting glass containers, the combination comprising a conveyor, a table, an indexing head having a plurality of circumferentially spaced container receiving pockets mounted for rotation whereby said pockets are successively moved from the position overlying said conveyor for receiving containers to positions along said table, a plurality of inspecting devices at circumferentially spaced points along the periphery of said indexing head and along said table for simultaneously inspecting a plurality of containers in said pockets, an entry station adjacent the area of juncture of the conveyor and indexing head, means providing a guideway for guiding the containers in a row and directing them substantially radially toward said indexing head, a discharge station spaced from said entry station at the area of juncture of the periphery of said indexing head and said conveyor, means responsive to an electrical signal from one of said inspection stations for preventing the normal discharge of a glass container from a pocket of said indexing head to the conveyor and removal from said pocket by said conveyor, a reject station interposed between said entry station and said discharge station at the area where the periphery of said indexing head overlies said conveyor, and reject means normally urging a container out of a pocket at said reject station, whereby when said responsive means prevents the normal discharge of a glass container, subsequent movement of said pocket containing the container to be rejected to the reject station brings the container into engagement with said reject means for discharge of said container from said pocket beyond the periphery of said conveyor, switch means in said guideway means adapted to be engaged by said glass containers, and means responsive to said switch means and movable in the path of said glass containers toward the periphery of said indexing head to obstruct the movement of said containers toward the periphery, when said guideway is not substantially filled with glass containers.

11. In an apparatus for inspecting glass containers, the combination comprising a conveyor for moving containers longitudinally toward an indexing head, an indexing head mounted for rotation with a portion of its periphery overlapping said conveyor, the periphery of said indexing head having circumferentially spaced container receiving pockets therein into which glass containers are separately fed by said conveyor, a table alongside said conveyor and underlying the periphery of said indexing head whereby said containers are moved in said pockets along said table, a plurality of inspecting stations along the periphery of said indexing head and along said table for simultaneously inspecting a plurality of containers in said pockets, one of said stations comprising a plug gauge movable periodically downwardly into the upper end of a container at said inspection station for checking the internal diameter of the neck of the container, a successive station comprising inspecting apparatus for checking the outer diameter of said container and checking for height, warp and dip, and cocked finish condition of the finish of the container, another inspecting station comprising apparatus for inspecting for vertical checks in the finish of the container, another inspecting station comprising apparatus for inspecting for horizontal checks in the finish of the container, a pad at each of said three last-mentioned inspecting stations, means for rotating each said pad for rotating a container at the inspecting station, said apparatus for inspecting for vertical checks comprising a light source, a mirror, a housing in which said mirror is mounted, means for directing a beam from said light source against said mirror and focusing it in a spot in the finish of the container, and light sensitive means externally of the container adjacent the path of the containers at the inspecting station adapted to be energized by reflection of light by a vertical check, and means responsive to the movement of the indexing head in bringing a container to the inspection station for raising the mirror to permit a container to enter the inspection station and thereafter lower said mirror into the open mouth of the container, said means for raising and lowering said mirror comprising a spring yieldingly urging said mirror housing downwardly, and means responsive to the movement of the indexing head to bring the container into inspecting position for raising said housing against the action of said spring and permitting said housing to be lowered.

12. In an apparatus for inspecting glass containers, the combination comprising a conveyor, a table, an indexing head having a plurality of circumferentially spaced container receiving pockets mounted for rotation whereby said pockets are successively moved from the position overlying said conveyor for receiving containers to positions along said table,
said conveyor being aligned so that it moves said containers toward said table and successively into said pockets,
and an apparatus for inspecting for vertical checks comprising
a light source,
a mirror,
a housing in which said mirror is mounted,
means for directing a beam from said light source against said mirror and focusing it in a spot in the finish of the container,
and light sensitive means externally of the container adjacent the path of the containers at the inspecting station adapted to be energized by reflection of light by a vertical check,
and means responsive to the movement of the indexing head in bringing a container to the inspection station for raising the mirror to permit a container to enter the inspection station and thereafter lower said mirror into the open mouth of the container,
said means for raising and lowering said mirror comprising
a spring yieldingly urging said mirror housing downwardly,
and means responsive to the movement of the indexing head to bring the container into inspecting position for raising said housing against the action of said spring and permitting said housing to be lowered.

References Cited by the Examiner

UNITED STATES PATENTS

| | | | |
|---|---|---|---|
| 2,368,796 | 2/1945 | Ardell | 209—88 |
| 2,407,062 | 9/1946 | Darrah | 209—88 |
| 2,542,090 | 2/1951 | Lorenz | 209—88 |
| 2,596,342 | 5/1952 | McNutt et al. | 209—88 |
| 2,977,731 | 4/1961 | Brook. | |
| 2,988,218 | 6/1961 | Fedorchak et al. | 209—88 |
| 3,074,550 | 1/1963 | Moreland | 209—75 |
| 3,098,564 | 7/1963 | Fouse et al. | 209—111 X |
| 3,101,848 | 8/1963 | Uhlig | 209—111 X |
| 3,188,743 | 6/1965 | Strzala | 33—174 |

M. HENSON WOOD, JR., *Primary Examiner.*

R. A. SCHACHER, *Assistant Examiner.*